UNITED STATES PATENT OFFICE.

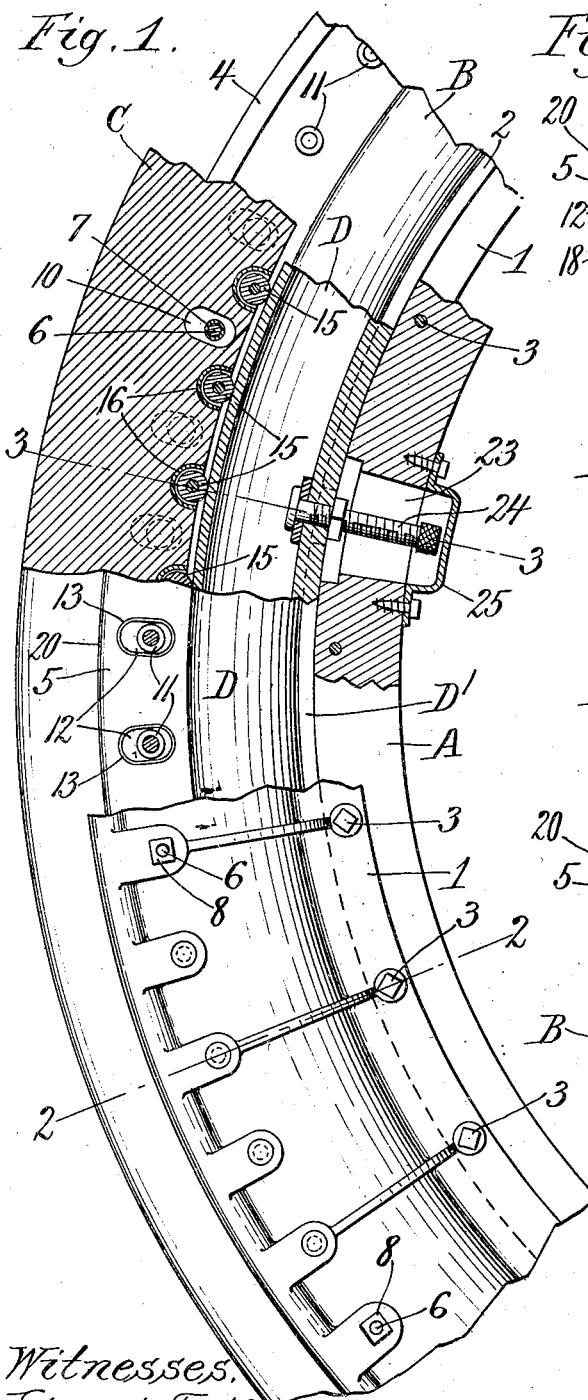
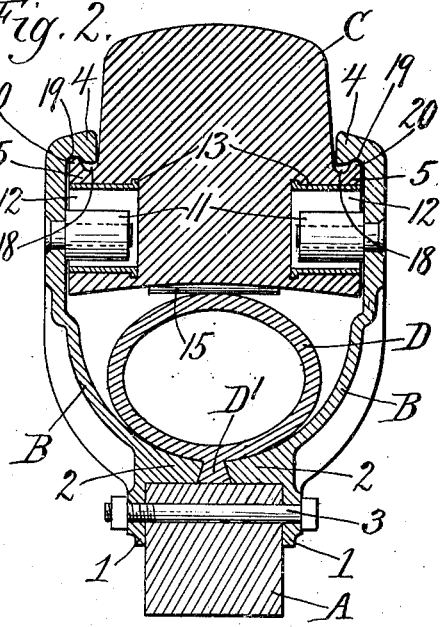
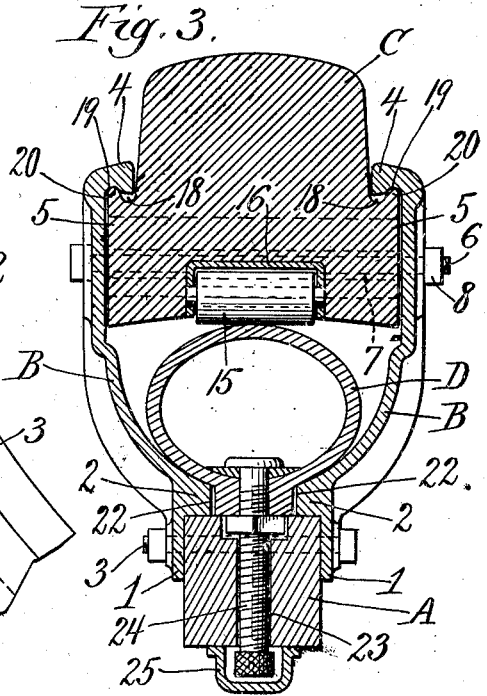

MELVILLE CLARK, OF CHICAGO, ILLINOIS.

VEHICLE WHEEL AND TIRE.

1,006,465.   Specification of Letters Patent.   Patented Oct. 24, 1911.

Application filed October 19, 1910. Serial No. 587,793.

*To all whom it may concern:*

Be it known that I, MELVILLE CLARK, a citizen of the United States, residing at Chicago, in the county of Cook and State of Illinois, have invented certain new and useful Improvements in Vehicle Wheels and Tires, of which the following is a specification, reference being had to the accompanying drawings, forming a part thereof.

The purpose of this invention is to provide an improved construction of pneumatic and cushioned tires for vehicle wheels especially adapted for automobile wheels and the like.

It consists in the elements and features of construction shown and described as indicated in the claims.

In the drawings: Figure 1 is a partially sectional side elevation of a segment of a wheel rim and tire thereon embodying this invention, the retaining guards being in part broken away to show the lateral surface formation of the cushion and pneumatic tire elements, and the latter being in part shown in section axial with respect to the pneumatic tube; Fig. 2 is a section at the line 2—2 on Fig. 1; Fig. 3 is an enlarged section at the same plane as Fig. 2, showing the form of the engaging features of the rubber tread and metal guard.

In general features, the construction shown in this application is similar to that shown in my pending application, No. 515,042, filed August 28, 1909.

The drawings show the customary wood felly, A, of the wheel, having the tire consisting of lateral metal guards B, B, which are formed with angle seats at their inner periphery,—which result from the extension of the flanges, 1, in the plane of the wheel inwardly from the annular web 2, which encompasses the felly,—for seating at the opposite outer side corners of the felly to which said retaining guards are secured by bolts or screws 3. At their outer circumferences, the guards B, B, are each provided with an annularly projecting bead or lip, 4, hereinafter more particularly referred to, for engaging the annular lateral projections 5 of the tread member C of the tire, which is embraced between the two guards outside of the pneumatic tube or air-spring D, which is also embraced between the two guards, being seated upon them at its inner circumference and engaged between them by means of a dove-tailed rib D¹, projecting from its inner circumference, and entering between the proximate edges of the webs 2, 2, of the opposite guards, said edges being undercut or beveled so as to form a dove-tailed opening to receive the dove-tailed rib D¹ of the tube D. The two guards B, B, are bound together near their circumference by tie-rods or bolts, 6, on which there are sleeves 7, for spacing the two guards apart, so that the two bolts may be bound tightly in place by their nuts 8, without crowding the two guards together beyond the limit determined by the length of the sleeves. The tread member C has apertures 10 extending through it from side to side at as many points in its circumference as there are bolts or tie rods 6, said apertures being elongated radially with respect to the wheel to accommodate the yielding of the tire to the load. The dimension of these apertures 10, in a direction circumferential with respect to the wheel, is enough greater than the diameter of the sleeves 7, so that unless the tire creeps circumferentially about the wheel, there will be no rubbing of the sides of the apertures against the sleeves.

To prevent such creeping of the tread member, there are provided, projecting inwardly from the guards B, B, stud and roll abutments 11, which are accommodated in recesses 12, formed in the sides of the tread member C, said recesses being elongated radially with respect to the wheel. These stud and roll abutments fit loosely within the lining or reinforcement 13, with which the recesses are provided, to save the rubber of the tread member from crowd and wear from said abutments.

The engagement of the pneumatic tube, by means of its dove-tailed rib D¹, between the inner edges of the webs 2 of the guards B, is designed to be a firm engagement, preventing any slipping of the rib between the engaging webs, 2, 2, and so preventing any creeping of the pneumatic tube D around the wheel.

The abutments 11, engaging the tread member, as described, operating to prevent any creeping of the tread member, will measurably prevent not only the distortion of the inner tube D, but also rubbing between the outer circumference of that tube and inner circumference of the tread. But experience has demonstrated that notwithstanding the precautionary measures described for preventing creeping, there is a considerable amount of wear between the contacting circumferential surfaces of the tube and the tread member, and this wear is liable gradually to reduce the thickness of the tube at the area of contact, resulting in its ultimate rupture. To obviate this wear, there are provided a multiplicity of anti-friction rollers 15, journaled in metal chairs or boxes 16, which are embedded in the tread member at its inner circumference, and designed to be permanently joined thereto, said rollers being protruded just enough from the inner circumference of the tread member to receive the contact of the tube. The tube D being of the usual structure of such tubes for automobile wheel tires,—substantially unstretchable, so that under inflation it expands only to the definite limit determined by its fabric, and do not occupy the entire space bounded by the guards B and the tread member C, and is substantially of the form shown in Fig. 2, which adapts them to roll slightly at its inner seating on the guards, and thereby there is avoided any substantial slippage causing rubbing of the tube upon the rollers 15, under the side stress experienced by the tire in running on a side hill, or encountering an obstacle at one side, because, in such action, the tube rolls laterally, to accommodate the crowding of the tread member C upon it, which is greater at one side than the other under the conditions noted.

The particular form of the shoulders which form the outer circumferences of the lateral projections 4 of the tread member C, shown in the enlarged detail view of Fig. 3, is that said shoulders are cut back next to the body of the tread member, forming a deep groove, 18, extending all around the tread member, and the overhanging lip 5 of the guard is slightly cut back at its inner angle, forming an annular recess or groove 19, which affords a seat for the outer peripheral edge or bead 20 of the projection 4, said recess or groove, 19, however, being very much shallower than the groove 18, so that when the tread member is in position between the guards, there is annular cavity or clear space left between the overhanging lip 5 of the bottom of the groove 18. The purpose of this construction is to prevent water and sand working in between the guard and the tread member, and filling up or stopping more or less of the cavity between the guards and the tread in which the tube D is contained, the entrance of water and sand to this cavity being a well-understood cause of injury to the tube, resulting in grinding it away until it bursts. When the lip of the guard and the engaging shoulder are matched to each other, so that they fit closely or approximately, any sand which enters between them is liable to be gradually fed by friction around past the side of the projections 4 of the tread, into the cavity in which the tube D is located; but when there is a considerable space, such as is provided by the groove 18, the sand which enters is thrown out by centrifugal force as the wheel rotates, and this is the purpose of the construction, which not only causes sand, but also water, to be discharged before it creeps around into the inner cavity where it would tend to cause the damage referred to.

Notwithstanding the provisions for preventing creeping of the tube, more or less movement is liable to occur; and in order that such movement may not operate to rupture the tube at the point at which the inflating nozzle is attached, in view of the fact that such nozzle must protrude out through the felly and thereby be engaged with the latter, an aperture 22 is provided in the web 2 of one or both of the guards, and coincident therewith, an aperture 23 in the felly, through which the inflating nozzle 24 protrudes, said apertures in the web and felly being elongated circumferentially with respect to the wheel, so as to accommodate a limited movement of the pneumatic tube around the wheel. In order to prevent the entrance of dirt through the elongated aperture, and also to guard the nozzle, a metal hood 25 is provided, secured to the felly exteriorly thereof and closing the aperture in the felly and inclosing the nozzle.

I claim:

1. A wheel tire comprising lateral guards and an intervening flexible and elastic tread member and an inclosed pneumatic tube or air spring, the tread member having distributed throughout its inner circumference a multiplicity of housings embedded in said tread member, and transverse rollers journaled in such housings with their inner circumferences exposed for contact with the outer circumference of the pneumatic tube.

2. A vehicle wheel comprising, in combination with the felly, a tire comprising lateral guards and a tread member embraced between the guards, and a pneumatic tube inclosed by the guards and tread member; an inflating nozzle attached to the pneumatic tube at the inner side; the guards and felly being apertured to permit said nozzle to protrude, such aperture being elongated circumferentially in respect to the wheel to accommodate a limited movement of the pneumatic tubes with respect to the wheel; and a hood attached exteriorly to the felly, covering such opening and the nozzle.

In testimony whereof, I have hereunto set my hand, at Chicago, Illinois, this 1st day of October 1910.

MELVILLE CLARK.

Witnesses:
M. GERTRUDE ADY,
JEAN ELLIOTT.